Oct. 7, 1952   W. W. PARSONS   2,613,104
DETACHABLE LIGHT REFLECTOR FOR VEHICLE BODIES
Filed May 15, 1950
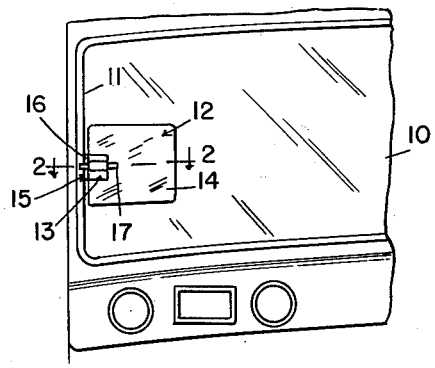
FIG.I.
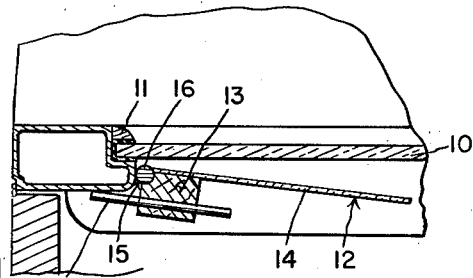
FIG.2.
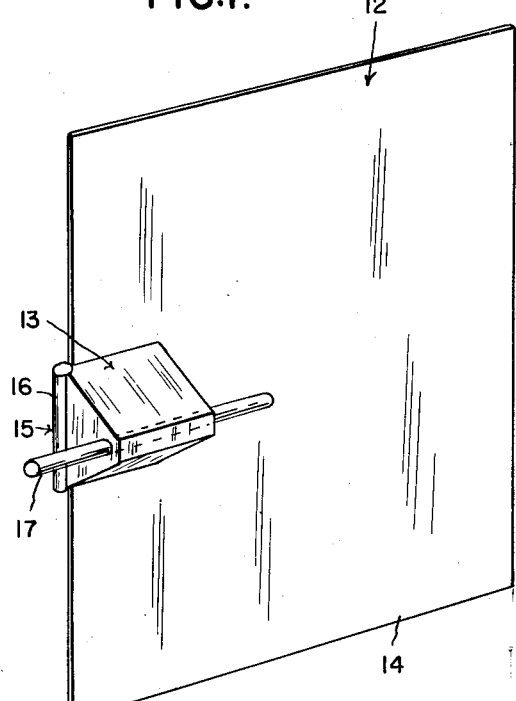
FIG.3.
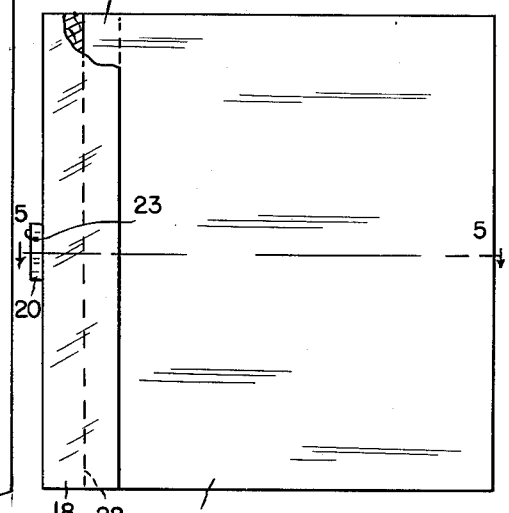
FIG.4.
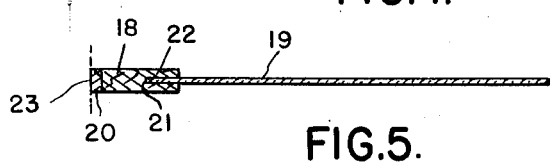
FIG.5.
INVENTOR.
WALTER W. PARSONS
BY
ATTORNEYS Patented Oct. 7, 1952

2,613,104

UNITED STATES PATENT OFFICE 2,613,104

DETACHABLE LIGHT REFLECTOR FOR VEHICLE BODIES

Walter W. Parsons, Lakeville, Mich.

Application May 15, 1950, Serial No. 161,947

2 Claims. (Cl. 296—97)

This invention relates to light reflectors for use in connection with vehicle bodies to protect the eyes of the operator or occupants against glare.

It is an object of this invention to provide a light reflector which may be quickly attached at any selected point adjacent the inner side of the windshield or any other window of the body, and which may be moved at will from one position to another without the necessity of manipulating fastener or equivalent elements.

It is another object of this invention to provide a reflector of the above general type which is held in place on the metal framing at the inner side of the windshield or other window of a vehicle body by a permanent magnet suitably secured to the reflector.

It is a further object of this invention to provide a reflector composed of a relatively few simple parts capable of being inexpensively manufactured and assembled.

The foregoing as well as other objects will be made more apparent as this description proceeds, especially when considered in connection with the accompanying drawing, wherein:

Figure 1 is a fragmentary elevational view of the inner side of a typical windshield for a vehicle body and showing a reflector embodying the features of this invention attached to the framing of the windshield;

Figure 2 is a sectional view taken substantially on the line 2—2 of Figure 1;

Figure 3 is a perspective view of the reflector;

Figure 4 is an elevational view of a modified form of reflector; and

Figure 5 is a sectional view taken on the line 5—5 of Figure 4.

In Figure 1 of the drawing a typical windshield 10 of a vehicle body is shown, and in accordance with conventional practice, a metal frame 11 surrounds the windshield. When the vehicle is traveling in a direction toward the sun, light rays of substantial intensity pass directly through the windshield and/or are reflected from the hood through the windshield. These rays of light are a source of discomfort to the operator as well as the occupants of the vehicle, and under severe conditions, seriously interfere with the vision of the operator.

The foregoing objection is overcome by a light reflector 12 comprising a supporting member 13, a sun or light shield 14 and attaching means 15. The supporting member 13 is shown in Figures 1 to 3 inclusive as being in the form of a block preferably formed of wood, although other materials such as plastic may also be used. In any case one side of the block is formed with a flat surface to which the shield 14 is attached in any suitable manner.

The shield 14 is in the form of a stiff or self-supporting sheet of material which may be opaque or may be transparent. In the event the shield 14 is transparent, it is preferably colored or otherwise treated to filter actinic rays passing through the windshield. It is preferred, however, to form the shield of opaque material in order to effectively shade the eyes from intense light rays and with this in view, the shield is relatively small in size so as not to block proper vision through the windshield. In any event one edge portion of the shield is tacked, cemented or otherwise secured intermediate the ends to the flat attaching surface of the block 13.

The attaching means 15 comprises a permanent magnet in the form of a bar 16 having a high degree of retentivity and suitably secured to the block 13 at the outer edge of the latter. The bar magnet 16 is positioned to engage the frame 11 at any selected point to securely hold the shield 14 at the desired location adjacent the inner side of the windshield. Any tendency for the shield to tip or swing out of position is prevented by a pin 17 extending perpendicular to the bar magnet 16 and slidably supported in a bore formed in the block 13. The pin 17 frictionally engages the inner surface of the bore, and is of sufficient length to enable extending one end along the inner side of the frame 11 in the manner shown in Figure 2 of the drawing to hold the shield against accidental swinging movement in a direction away from the windshield.

The embodiment shown in Figures 4 and 5 comprises a supporting member 18, a shield 19, and a permanent magnet 20. The supporting member extends along one marginal edge 21 of the shield and is provided with a slot 22 for receiving the marginal edge 21 of the shield. The shield 19 may be identical to the shield 14, and may be frictionally held in the slot 22 or may be securely fastened in the slot by tacking or cementing.

The bar magnet 20 is preferably cemented to the outer edge of the member 18 intermediate the ends of the latter, and is provided with a flat surface 23 for seating engagement with the frame 11 of the windshield. Since the surface 23 is flat, there will be little tendency for the shield 19 to swing or tip inwardly relative to the windshield, and the pin 17 or its equivalent may be omitted.

While in describing both the above embodiments of the invention, particular stress has been placed on attaching the reflectors to the frame adjacent the windshield, it will of course be understood that either reflector may be used to advantage in connection with any one of the other windows in the body. In any case the nature of the reflectors are such as to permit the same to be quickly attached to the frame in any selected position without the necessity of manipulating fastener or equivalent elements.

What I claim as my invention is:

1. A light reflector for use in connection with a vehicle body having a window surrounded by metal framing, comprising a shield in the form of a relatively stiff, flat sheet having light reflecting characteristics, a supporting block of nonmagnetic material fixed to one side of said shield and having a face substantially coinciding with one marginal edge of said shield, said face extending laterally with respect to said shield from the said one marginal edge, a permanent magnet secured to said face of said block adjacent the said one marginal edge of said shield in a position to engage a selected part of the framing and to secure said shield thereto, and a brace carried by said block in laterally spaced relation to said shield and extending beyond the said marginal edge of the latter for engagement with the framing, thereby to resist tipping of said shield from its operative position relative to the vehicle body window.

2. The light reflector set forth in claim 1, said block having a bore therein spaced laterally from and extending generally parallel to said shield, and said brace comprising an elongated pin frictionally mounted in said bore for longitudinal adjustment.

WALTER W. PARSONS.

REFERENCES CITED

The following references are of record in the file of this patent:

UNITED STATES PATENTS

| Number | Name | Date |
|---|---|---|
| 1,587,144 | Burk | June 1, 1926 |
| 1,624,741 | Leppke et al. | Apr. 12, 1927 |
| 1,641,880 | Cohen | Sept. 6, 1927 |
| 1,910,503 | Schollmeyer | May 23, 1933 |
| 2,261,301 | Smith | Nov. 4, 1941 |